May 26, 1925.
H. T. BOYNTON
DUMPING VEHICLE
Filed Feb. 11, 1922
1,539,067
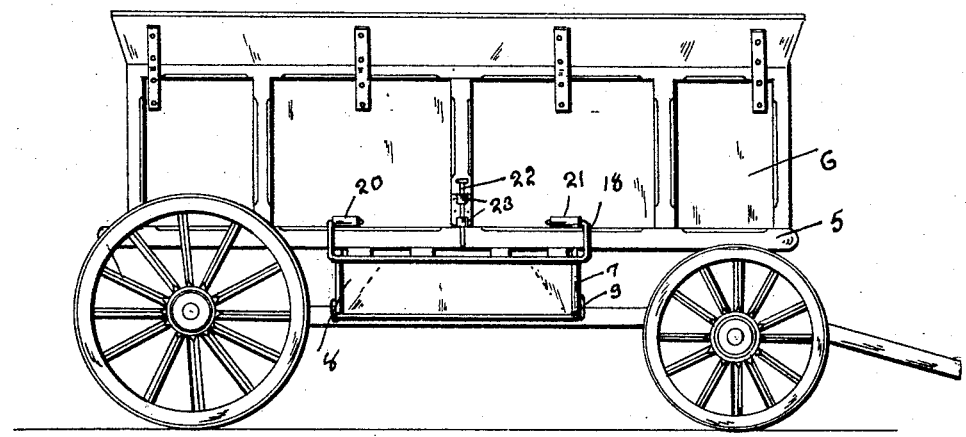
Fig. 1
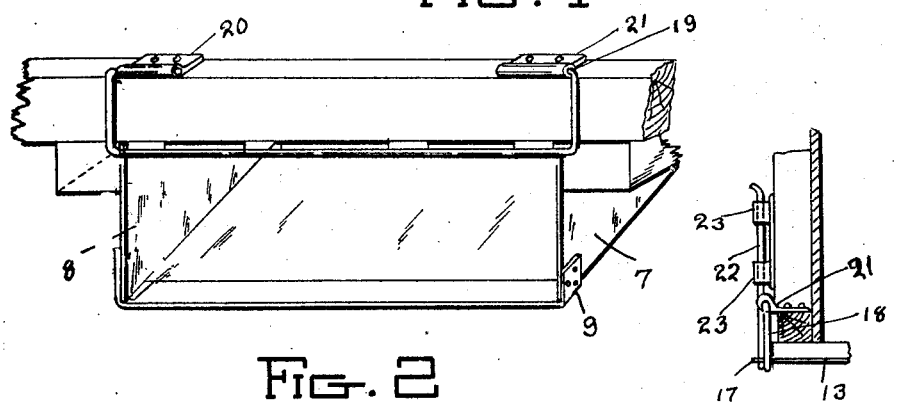
Fig. 2
Fig. 4
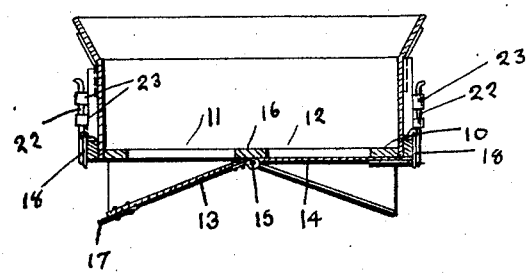
Fig. 3
INVENTOR
H. T. BOYNTON
Joseph J. O'Brien
ATTORNEY Patented May 26, 1925.

1,539,067

UNITED STATES PATENT OFFICE.

HARRY T. BOYNTON, OF RUSSELL, MASSACHUSETTS.

DUMPING VEHICLE.

Application filed February 11, 1922. Serial No. 535,928.

*To all whom it may concern:*

Be it known that HARRY T. BOYNTON, a citizen of the United States of America, residing at Russell, in the county of Hampden and State of Massachusetts, has invented certain new and useful Improvements in Dumping Vehicles, of which the following is a specification.

This invention relates to improvements in latches for dumping chutes of load dispensing vehicles and its leading object is to provide a latch which will maintain a downwardly swinging chute member in load supporting position and which may be easily operated to release the chute member to downwardly inclined position to distribute the load into a cellar or like holding space or compartment.

With the above and other objects in view this invention relates to certain new and useful constructions, combinations and arrangements of parts, clearly described in the following specification and fully illustrated in the accompanying drawings, in which:

Figure 1 is a side elevation of a vehicle equipped with my improved latch.

Figure 2 is a detail perspective view on an enlarged scale.

Figure 3 is a transverse sectional view on a reduced scale.

Fig. 4 is a detail vertical sectional view on an enlarged scale showing the latch in locking position.

Referring to the accompanying drawings 5 designates a wheeled vehicle which is provided with a box shaped load containing body adapted to hold coal, grain or other fluent material capable of flowing for discharge.

The body is equipped with triangular shaped side plates 7 and 8 which are connected to each other by a U shaped supporting bar 9 the upturned ends of which are riveted or otherwise secured to the outer portions of the side plates 7 and 8. This construction is duplicated on each side of the vehicle under the bed 10 thereof and this bed is provided with discharge openings 11 and 12 through which the material can flow into the chute construction which comprises the triangular plates 7 and 8. The openings 11 and 12 are normally closed by means of downwardly swinging chute plates 13 and 14 which are hingedly connected at 15 to a centrally located bar 16 attached to or forming part of the bed 10.

Each of the downwardly swinging plates 13 and 14 is provided with longitudinally disposed reinforcing bars 17 which are adapted to rest in their lower position upon the U shaped supporting straps 9, the outer ends of said reinforcing bar 17 extending endwise of the downwardly swinging plates 13 and 14 so that said ends will rest on the supporting strap 9 when the plates 13 and 14 are in their inclined position as shown in Figure 3.

The plates 13 and 14 are maintained in horizontal position by means of a U shaped hanger 18 the ends of which are turned toward each other to provide trunnions 19 and 20 which are received by the eyes of the hinge members 21 secured to the side rails of the body 5. The U shaped supporting member 18 is adapted to rest against the side rail to which it is attached while depending from the hinge members 21 and in such position it will support its companion plate 13 or 14, the longitudinal reinforcing bars 17.

The U shaped member 18 is held in latching position by means of a vertically sliding bolt 22 arranged to slide in the keepers 23 which are secured by the attaching plate 24 against the side of the body 5. This vertically sliding bolt engages the central lower part of the U shaped rod 18 and maintains said rod against the side of the body and under the reinforcing member 17 which rest on said central portion and which are thus held against downward movement. By forcing the bolt 22 upwardly and swinging the latching member 18 outwardly the chute plate will drop by its own weight to rest on the U shaped supporting strap 9. Owing to the nature of the construction used for latching the chute plate it will be impossible for the chute plate to drop accidentally and discharge the load.

Having described my invention, I claim:

1. A dumping vehicle consisting of a wheeled body having a bed provided with an opening, a closure for said opening hinged at its inner end under the bed and adapted to occupy a normal horizontal position across said opening, means for supporting said closure in an open position so that it will constitute an inclined chute by which material may be delivered from said bed, a U-shaped member pivoted at its ends to the side of the body above the bed whereby its lower end will form a support for the closure in its normal horizontal position, and means for locking the U-shaped member in supporting position to retain the closure in horizontal position.

2. A dumping vehicle consisting of a wheeled body having a bed provided with an opening, a closure for said opening hinged at its inner end under the bed and adapted to occupy a normal position across said opening, means for supporting said closure in an open position so it will constitute an inclined chute, a U-shaped member pivoted at its upper ends to the side of the body whereby its lower end will swing under the closure to support the same in elevated position, and a locking bolt slidably mounted on the side of the body to retain the U-shaped member in supporting position to prevent displacement of said closure.

HARRY T. BOYNTON.